Aug. 22, 1933.                J. L. FORD                1,923,481
                           METER BOX COVER
                         Filed June 5, 1931
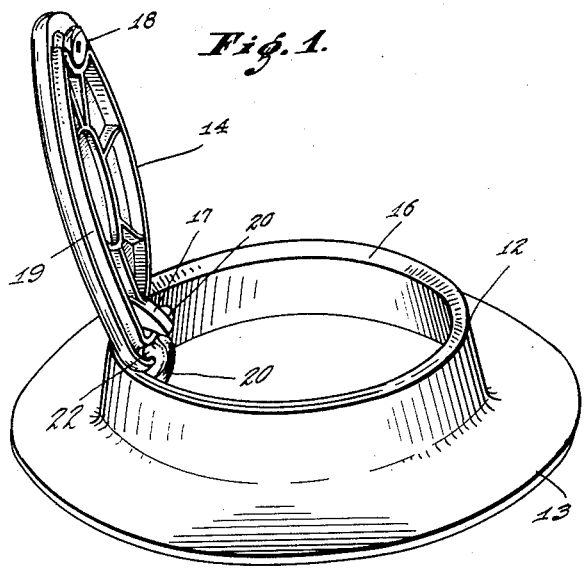
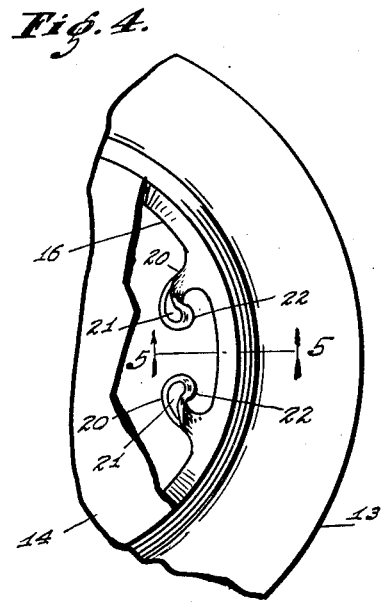
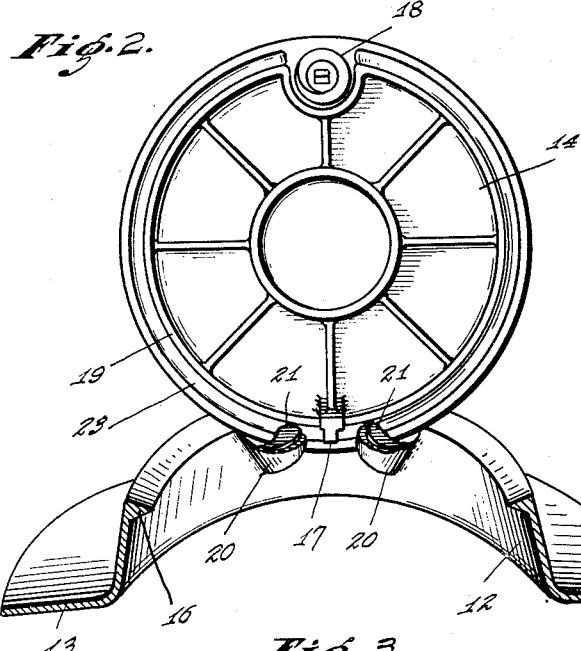
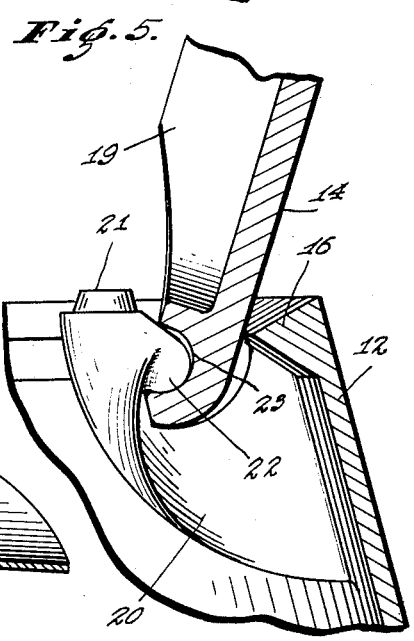
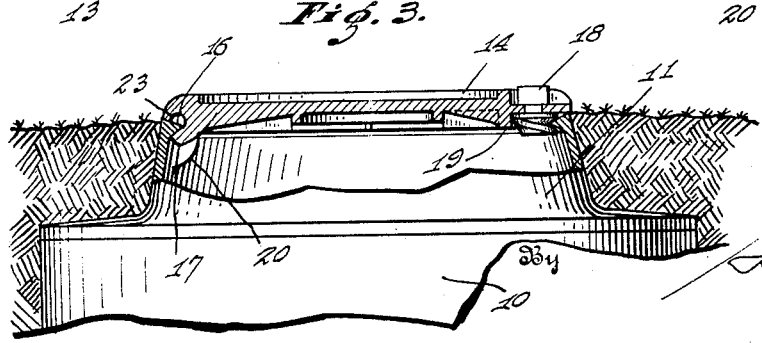
Inventor
John L. Ford, Patented Aug. 22, 1933

1,923,481

UNITED STATES PATENT OFFICE 1,923,481

METER BOX COVER

John L. Ford, Wabash, Ind., assignor to The Ford Meter Box Company, Wabash, Ind., a Corporation of Indiana Application June 5, 1931. Serial No. 542,250

4 Claims. (Cl. 137—13)

My invention is concerned with meter boxes of the type used to enclose and protect a water, gas, or similar meter installed below the ground level. Such boxes commonly comprise a body portion which is sunk in the ground to enclose the meter, the upper end of the box being usually substantially flush with the ground and having a removable cover. One such meter box, with its associated cover, is shown in Ford Patent No. 974,650.

It is the object of my invention to provide the box and cover with co-operating provisions which will give all the advantages of a hinge mounting for the cover, but which will permit the cover to be removed entirely from the box. A further object of my invention is to produce a box and cover having the advantage of a hinge mounting and to so construct the box and cover that no machining operations such as those necessary in the making of hinges are required, and thereby to reduce the cost of the box and cover.

In carrying out my invention, I construct the cover and the box-top so that they will interfit to close the opening in the box-top, and I provide the box-top with one or more fingers which extend inwardly below such opening. These fingers are disposed in such a position that when the cover is moved for a slight distance generally parallel to the plane of the box opening and then titled toward raised position they will be engaged by the lower surface of the cover at an intermediate point thereof and serve as a fulcrum about which the cover may be swung during a part of its opening movement. The fingers are shaped, disposed, or otherwise fashioned to clear that portion of the cover which moves downwardly as the cover is opened and to engage such cover-portion only after the cover has passed the vertical in its opening movement.

The accompanying drawing illustrates my invention: Figs. 1 and 2 are perspective views of the top of the meter box, the cover being shown in raised position; Fig. 3 is a vertical section through the cover and top of the box with the cover in closed position; Fig. 4 is a fragmental plan of the cover and box-top, a portion of the cover being broken away; and Fig. 5 is a fragmental vertical section on the line 5—5 of Fig. 4.

As indicated in the drawing, the body 10 of the meter box is hollow and cylindrical, a box-top 11 resting on its upper end. The box-top, which is conveniently a casting, is preferably formed with an upwardly projecting central or neck portion 12 and a peripheral flange 13 which extends generally outward from the neck and is of a diameter such that it may rest upon and be supported by the upper end of the box-body 10.

The cover 14 is of a diameter to overlie and be supported upon the upper end of the neck 12. Any of various means may be employed for locking the cover in closed position, the means shown being that described in the prior patent above referred to. With such a cover-locking means, the neck 12 of the box-top is provided at its upper end with an inwardly projecting flange 16 of triangular cross-section. The lower surface of the cover is formed to provide an outwardly and downwardly projecting lug 17 adapted to extend beneath the flange 16 when the cover is closed. Opposite such lug there is mounted in the cover a rotatable locking member 18 the lower end of which is generally conical and provided with a helical groove of cross-section corresponding to that of the flange 16. The lower end of the rotatable locking element 18 is of such a diameter that it will clear the flange 16 to permit the cover to be raised.

The upper surface of the neck 12 and flange 16 and the lower surface of the cover 14 at the periphery thereof are machined to provide smooth interengageable surfaces, such surfaces being preferably conical. The cover may be provided with a downwardly extending annular flange 19 which fits fairly closely within the flange 16 to center the cover.

The above described parts are set forth merely by way of example, as my invention may be incorporated in meter boxes having widely varying details of construction.

In embodying my invention in a meter box of the type described, the neck portion 12 of the box-top is provided with one or more inwardly projecting fingers 20, here shown as two in number, preferably integral with the box-top. These fingers join the neck 12 below the flange 16 and extend generally inwardly and upwardly terminating in surfaces 21 which are located slightly below the lower surface of the cover 14 when the cover is in closed position. On its rear surface, each of the fingers 20 may be provided with a rearwardly extending boss 22. The cover 14 is formed with a recess or groove 23 positioned to receive the bosses 22 when the cover is raised to the full-line position illustrated in Fig. 5. Preferably, the recess or groove 23 extends for substantially the complete circumference of the cover in order to provide relief for the machining of the cover-edge.

The peculiar shape of the fingers 20 in plan, best shown in Fig. 4, is provided for the purpose of eliminating the necessity of a core in forming the bosses 22.

When the cover is closed, it occupies the position illustrated in Fig. 3, it being held in closed position by the locking element 18 and by the finger 17. To open the box, the locking element 18 is rotated, and the co-operation between the groove and its lower portion and the flange 16 serves to raise the cover at the front until the groove in the lower portion of the locking element 18 becomes disengaged from the flange 16. When this occurs, the cover may be moved forwardly until its rear edge clears the flange 16 at the back of the neck portion 12 of the box-top. Preferably, the parts are so proportioned that the inner surface of the flange 19, by engagement with the fingers 20, limits forward movement of the cover. If the cover is then tilted by raising it at the front, it will pivot first upon the upper ends 21 of the fingers 20 and then upon the flange 16 at two spaced points near the rear of the neck-portion 12. As the cover 14 nears a vertical position, the groove 23 will receive the bosses 22; and after the cover is swung past vertical position, the bottom of the groove 23 will strike the bosses 22, and further movement of the cover will be limited. In open position, the cover rests upon the edges of the opening at two spaced points near the rear of the neck 12, the bosses 22 are received in the groove 23, and the force of gravity tends to hold the cover in the position illustrated in Fig. 5.

In the vicinity of the fingers 20, the flange 19 may be relieved as is clear from Fig. 5 in order that it will not strike the fingers 20 and interfere with opening or closing of the cover.

To close the box, the cover is swung forwardly from the position illustrated in Figs. 1, 2, and 3. It is then moved rearwardly to engage the lug 17 beneath the flange 16, and the locking element is then rotated, the helical groove in the lower end of the locking element co-operating with the flange 16 to draw the cover downwardly and hold it in closed position.

As indicated in the drawing, I prefer to employ two of the fingers 20 and one lug 17, the cover being positioned so that the lug 17 is located between the fingers; but this arrangement may be varied if desired.

The cover described has several advantages over other meter-box covers of which I am aware. It can readily be opened and closed with but one hand; and when opened it occupies an approximately vertical position supported from the box-top with the result that it does not come in contact with dirt, leaves, or other foreign matter which otherwise might be dragged into the box or between the mating surfaces of the box-top and cover where they would prevent complete seating of the cover. Through the use of my invention, the cover possesses all the desirable features of a hinged cover and has the additional advantages that no machined hinge joint is necessary and that the cover can be readily removed from association with the box-top when desired.

I claim as my invention:

1. In a casing, a top having a circular opening in a generally horizontal plane, a removable cover for said opening, said top being provided around said opening with a circumferential seat for said cover, a pair of fingers extending into said opening from the rear of said top below said seat, the inner ends of said fingers being disposed adjacent the lower surface of said cover and spaced inwardly from said seat, the upper surfaces of said fingers, between the finger-ends and the seat, being depressed below the cover-portions above them to permit the cover to be moved forwardly from seated position and to provide clearance for the descending rear edge of the cover as the cover, after being moved forwardly from seated position, is swung upwardly about the finger-ends as pivots.

2. In a casing, a top having an opening in a generally horizontal plane, a removable cover for said opening, said top being provided around said opening with a seat engaging said cover near the periphery thereof, and a pair of fingers rigid with said top and extending into said opening, the inner ends of said fingers being disposed between the front and rear limits of said seat and adjacent the lower surface of the seated cover and near, but spaced forwardly from, the rear of said opening to provide a pivotal support about which the cover may be swung, said opening being shaped in plan so that its width, measured parallel to the axis of pivotal support provided by said fingers, decreases from such axis toward the rear of the opening, whereby upon forward movement of said cover the periphery thereof will clear that portion of the seat lying to the rear of the axis of pivotal support provided by said fingers, said fingers being so disposed and shaped as not to interfere with the descending rear edge of the cover as the cover, after being moved forwardly, is swung upwardly about the finger-ends as pivots.

3. The invention set forth in claim 2 with the addition that said cover is provided with a rearwardly extending lug between said fingers adapted to engage beneath the edge of said opening when the cover is in place and with a locking device located diametrically opposite said lug and including a movable part adapted to engage said top to hold the cover in place.

4. The invention set forth in claim 2 with the addition that said fingers and said cover on its lower side have provisions interengageable when the cover is at the limit of its opening movement for holding the cover in open position.

JOHN L. FORD.